United States Patent

Eckert et al.

[15] 3,680,117
[45] July 25, 1972

[54] TACAN METHOD

[72] Inventors: Klaus-Dieter Eckert, Ludwigsburg; Hans-Joachim Roper, Kornwestheim, both of Germany

[73] Assignee: International Standard Electric Corporation, New York, N.Y.

[22] Filed: June 17, 1970

[21] Appl. No.: 47,067

[52] U.S. Cl. ............................343/106 R, 325/143, 343/204
[51] Int. Cl. ..............................................G01s 1/46
[58] Field of Search ..........................343/106, 204; 325/143

[56] References Cited

OTHER PUBLICATIONS

" Tacan Data Link," Electrical Communication, Vol. 34, No. 3, Sept., 1957.

*Primary Examiner*—Benjamin A. Borchelt
*Assistant Examiner*—Richard E. Berger
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An antenna system arranged at the end of the runway radiates Tacan pulses, and an antenna system arranged beside the runway radiates additional information in the form of pulses having specific time relationships with the Tacan pulse-pair. The additional information is evaluated by means of a Tacan receiver whose video stage is followed by a decoder for the additional information.

7 Claims, 5 Drawing Figures

TACAN METHOD

BACKGROUND OF THE INVENTION

The known Tacan system makes possible the transmission from the ground and airborne evaluation of two coordinates, namely azimuth and distance. For the transmission of the value of the azimuth angle, a directionally dependent sinusoidally amplitude-modulated pulse-pair train with a fixed spacing of the single pulses of the pulse-pair is radiated on a carrier wave (range 1 GHz). The amplitude modulation of the pulse-pairs, as seen over a great number of pulse-pairs, contains the azimuth information while the distance is determined from the travel time of an interrogation pulse-pair transmitted from an aircraft and the corresponding response pulse-pair transmitted from the ground station. The spacing of the single pulses of the pulse-pairs also characterizes the mode of operation (X or Y operation, pulse spacing 12 $\mu$s or 36 $\mu$s, respectively); the reference signals required for the azimuth determination are transmitted by coding some pulse-pair groups.

In many cases, however, it is desirable to provide additional information besides that on azimuth and distance, for example on the elevation angle or the identification of a sector of a certain width ($\pm 18°$ around the runway center line) and, if need be, on other data, e.g., on the traffic near the radio beacon at a particular moment (landing possibility, holding pattern), appropriately in binary form. To this end, as far as possible, a compatible method should be used, i.e., a normal Tacan receiver, which is not designed for the evaluation of additional information, should be able to evaluate the azimuth and the distance in cooperation with a radio beacon which also radiates the additional information, just like in the standard Tacan system. An obvious solution would be a multi-channel operation in which the additional information is transmitted in a channel other than that transmitting the data of the standard Tacan system. However, since the equipment would have to be made in duplicate, this would entail an increased expenditure both at the sending end (ground) and at the receiving end (on board aircraft). By means of time multiplex, the expenditure would be slightly reduced but at the same time this could decrease the quantity of data per information.

The nature of the invention consists in that the pulses provided for the transmission of the additional parameters and forming a pulse signal are, with respect to the time distance from one of the single pulses of a pulse-pair, strictly bound to these pulse-pairs serving the azimuth determination. Thus they are coherent with them and are, therefore, suitable for the transmission of information peculiar to the system. Therefore distance decoding of the pulse signal is possible only in connection with the pulse-pairs for the azimuth determination. Each additional pulse of the pulse signal carries, in any form, additional information. In this case, the form of the information may lie, for example, in the amplitude difference (amplitude modulation) of a first additional pulse of the pulse signal, as seen over a plurality of pulse groups; the varying time distance of a second additional pulse from the first additional pulse signal may represent, for example, a binary "0" or a binary "1."

In the Tacan system it is known to transmit information not peculiar to the system as pulse telegram in the direction ground-to-air and vice versa during the so-called dead time (minimum time interval between two successive azimuth pulse-pairs) which is 60 $\pm$ 10 $\mu$s (TACAN-DATA-LINK, Electrical Communication, Vol. 34, Sept. 1957, No. 3).

SUMMARY OF THE INVENTION

It is an object of the present invention to provide a TACAN method wherein, for the airborne azimuth determination, a sinusoidally amplitude-modulated pulse-pair train is transmitted on a carrier wave, if necessary with additional pulses for distance measurement and/or pulse telegrams for the transmission of information not peculiar to the system.

According to a broad aspect of the invention there is provided a method of transmitting information from a ground station to an aircraft wherein said information is transmitted on a carrier wave containing a sinusoidally dependent amplitude modulated pulse-pair train, wherein the improvement comprises the steps of transmitting additional information in the form of at least one pulse on the carrier wave of said pulse-pairs associated with and equally spaced from each of said pulse-pairs, and decoding said one pulse on board the aircraft to extract said additional information.

Basically, the spacing of the single pulses of the pulse signal from each other and from the azimuth pulse-pairs are unimportant; they only must be so chosen that all additional pulses fall within the maximum dead time of 70 $\mu$s. In this manner, the pulse distribution, which normally is random in the Tacan system, is not disturbed by the single pulses contained in the pulse signal; likewise, the freedom from interference is maintained as in the normal Tacan receiver without any additional decoder, which receives a ground station extended according to the invention. The currently used airborne Tacan equipment may be extended in a simple manner by an additional device arranged subsequently to the video detector, with the aid of which the additional pulse signal with its single pulses may be evaluated with respect to the information contained therein.

The method, whose principles are described here, may be used both for the normal Tacan system and for an approach sector beacon described in U.S. patent applications Ser. Nos. 804,166 filed Mar. 4, 1969 by E. Kramar (now U.S. Pat. No. 3,587,099) and Ser. No. 804,169 filed Mar. 4, 1969 by K. Eckert in which the knowledge on board aircraft of the elevation angle is of special importance during the approach. In this sector radio beacon (SETAC-A), the same radiation field for azimuth and distance measurement as provided by the standard Tacan system all around 360°, is produced in a sector of a certain width, e.g., $\pm 18°$, by the fact that the carrier wave (range 1 GHz) and at least one side-band (1 GHz + 15 Hz, 1 GHz + 135 Hz) of each of the modulated frequencies used in the Tacan system (15 Hz, 135 Hz), are transmitted from an antenna system arranged at one end of the runway.

Using the means of the invention, a further object may be attained in an appropriate manner, namely the transmission of elevation angle information in connection with the shortly described sector radio beacon according to the prior proposals mentioned above. This solution represents a new possibility of transmitting the elevation angle information as compared with a solution described in U.S. Pat. application Ser. No. 804,169 filed Mar. 4, 1969 without effecting the coarse and fine measurement of the azimuth.

The invention will now be described with reference to an embodiment thereof, which relates to the sector radio beacon described in the above-mentioned prior applications, and will be explained in more detail in conjunction with the accompanying drawings in which:

DESCRIPTION OF THE PREFERRED EMBODIMENT

Figure 1:
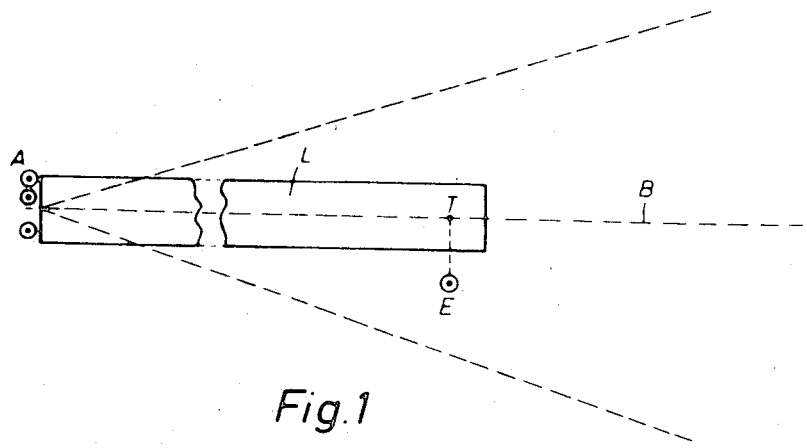
FIG. 1 shows the runway with the azimuth and elevation antenna system A and E, respectively.
Figure 2:
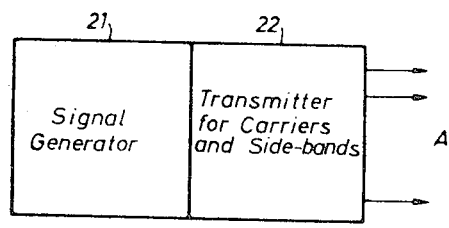
FIG. 2 shows the transmitting equipment associated with the azimuth antenna system A.

FIG. 1 shows the runway L with the azimuth antenna system A and the elevation antenna system E which is arranged beside the runway L athwart the intended touchdown point T for landing aircraft on the center line B. The three separate antennas of the azimuth antenna system A which is arranged at one end of the runway L are supplied with carrier and sideband energy from the transmitting equipment schematically illustrated in FIG. 2, thus providing a radiation pattern rotating with the superposition of the two modulating frequencies as described in a prior application number Ser. No. 804,166 filed Mar. 4, 1969. The transmitting equipment according to FIG. 2 with the equipment parts 21 (signal generation) and 22 (transmitter for carriers and side-bands of the two modulating frequencies) is already known and does not come under the scope of protection of the invention.

Figure 5:
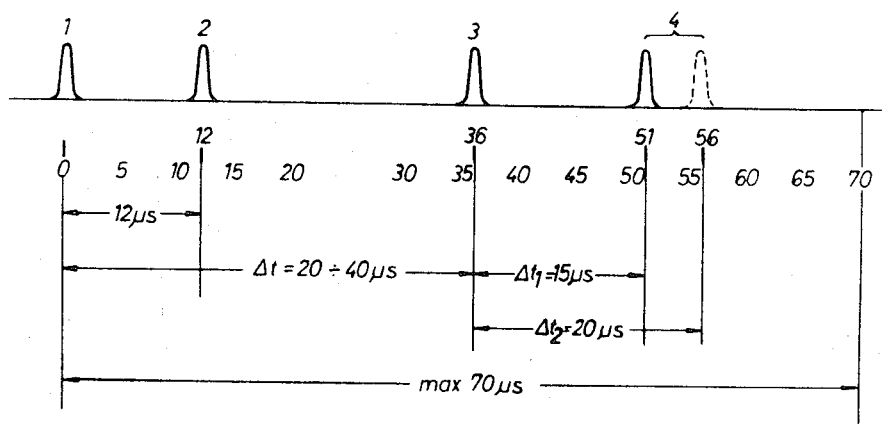
FIG. 5 shows the time assignment of the individual pulses.

The third pulse (pulse 3, FIG. 5) representing the elevation signal and to be sent out by the elevation antenna system E (transmitter 35, FIG. 3) is generated in such a way that the pulse-pairs (pulse 1 and 2, FIG. 5) transmitted by the azimuth antenna system A, are received in a receiving station (receiving-antenna 30, receiver-demodulator 21) associated with the transmitting equipment (transmitter 35, modulator 34, FIG. 3) and decoded (decoder 32). With the aid of a pilot pulse device, such as is known from precision distance measurement and indicated in FIG. 3 by the equipment part 33 (delay unit), it is insured that the third pulse (pulse 3, FIG. 5) is transmitted by the elevation antenna system E always by the exactly defined time $\Delta t$ later than a pulse-pair (pulse 1/2, FIG. 5) transmitted by the azimuth antenna system A. It makes no difference whether the third pulse to be transmitted is derived from the first or the second single pulse of a received pulse-pair; the delay (33) must only be so chosen that the pulse is placed at that particular place of the time axis, at which it is to appear. The value for $\Delta t$ (spacing between pulse 1 and pulse 3, FIG. 5) may be chosen, for example, between 20 $\mu s$ and 40 $\mu s$ (in the case of X operation).

For the transmission of a further information, an additional fourth pulse (pulse 4, FIG. 5) may be provided, which also is transmitted by the elevation antenna system E. A binary information may be contained, for example, in a distance coding ($\Delta t_1, t_2$, FIG. 5) by the fact that, for example, a distance of 15 $\mu s$ ($\Delta t_1$) from the third pulse represents a binary "0" and a spacing of 20 $\mu s$ ($\Delta t_2$) a binary "1." The spacings are not of decisive importance; they must only be so chosen that all pulses fall within the maximum dead time of 70 $\mu s$, which has been introduced in the Tacan system. To this end, two additional delay units (not shown) must be provided in the block diagram of FIG. 3.

Figure 3:
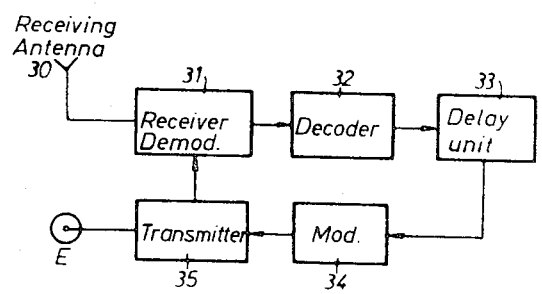
FIG. 3 shows the receiving-transmitting equipment associated with the elevation antenna system E.

The individual equipment parts of FIG. 3 are known, and those skilled in the art will be familiar with the way the equipment parts are combined into arrangements as well as with the insertion of additional delays for the fourth pulse (pulse 4, FIG. 5) for performing a desired function.

Figure 4:
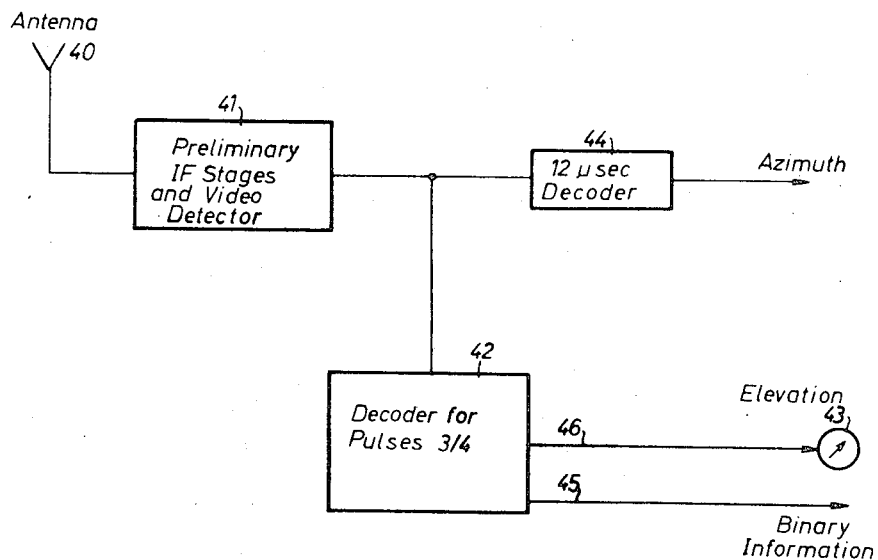
FIG. 4 shows the airborne receiving equipment.

The radiations of the two antenna systems A and E are received in airborne stations by means of a common receiver (FIG. 4), suitably the standard Tacan receiver (antenna 40, preliminary and intermediate frequency stages, video detector 41, decoder for azimuth and distance 44); the third and fourth pulse are decoded in a well known manner by means of an additional equipment (42, FIG. 4) arranged subsequently to the video detector, evaluated (output 64), for example, as value for the elevation angle and indicated, for example, by means of a suitable instrument (43).

The additional equipment (42) supplies at a further output (45) the additional data in the form of binary values ("0" or "1") associated with the time intervals $\Delta t_1$ and $\Delta t_2$, respectively.

I claim:

1. A method of transmitting information from a ground station to an aircraft wherein said information is transmitted on a carrier wave containing a sinusoidally dependent amplitude modulated pulse-pair train, wherein the improvement comprises the steps of:

transmitting additional information in the form of at least one pulse on the carrier wave of said pulse pairs associated with and equally spaced from each of said pulse pairs; and decoding said one pulse on board the aircraft to extract said additional information.

2. A method according to claim 1 wherein the information is contained in the amplitude modulation of said one pulse in successive pulse groups.

3. A method according to claim 1 wherein the information is contained in the spacing between said one pulse and one pulse of said pulse-pairs.

4. A method according to claim 1 wherein said one pulse is an unambiguity pulse said pulse defining a sector of a certain width.

5. A method according to claim 1 wherein said additional information contains the elevation angle of an interrogating airborne station.

6. A method according to claim 1 wherein said one pulse is radiated by an antenna system which is arranged beside a runway and at a distance corresponding to a touchdown point provided for landing aircraft.

7. A method according to claim 1 wherein the step of transmitting includes:

receiving pulse-pairs transmitted by an azimuth antenna system located at the end of a runway in receiving equipment located beside said runway at some distance from the end of said runway;

decoding said pulse-pairs in said receiving equipment;

generating said one pulse;

supplying said one pulse to a modulator of a transmitter associated with said receiving equipment after a suitable delay; and transmitting said pulse-pairs and said one pulse on the same carrier.

* * * * *

PO-1050
(5/69)

UNITED STATES PATENT OFFICE
CERTIFICATE OF CORRECTION

Patent No. 3,680,117　　　　　　Dated July 25, 1972

Inventor(s) K-D Eckert - H-J Roper

It is certified that error appears in the above-identified patent and that said Letters Patent are hereby corrected as shown below:

On the Title Page add the following:

[30]　Foreign Application Priority Data

June 26, 1969　　　Germany　　　P 1932 294.2

June 26, 1969　　　Germany　　　P 1932 295.3

Signed and sealed this 18th day of June 1974.

(SEAL)
Attest:

EDWARD M. FLETCHER, JR.
Attesting Officer

C. MARSHALL DANN
Commissioner of Patents